(12) United States Patent
Gruebele

(10) Patent No.: US 10,776,071 B2
(45) Date of Patent: Sep. 15, 2020

(54) WEARABLE AUDIO RECORDER AND RETRIEVAL SOFTWARE APPLICATIONS

(71) Applicant: Philip A. Gruebele, Tel Aviv-Jaffa (IL)

(72) Inventor: Philip A. Gruebele, Tel Aviv-Jaffa (IL)

( * ) Notice: Subject to any disclaimer, the term of this patent is extended or adjusted under 35 U.S.C. 154(b) by 0 days.

(21) Appl. No.: 16/678,066

(22) Filed: Nov. 8, 2019

(65) Prior Publication Data

US 2020/0125316 A1    Apr. 23, 2020

Related U.S. Application Data

(63) Continuation of application No. 15/352,372, filed on Nov. 15, 2016, now Pat. No. 10,489,103.

(51) Int. Cl.

| | |
|---|---|
| *G06F 3/16* | (2006.01) |
| *G10L 15/26* | (2006.01) |
| *G06F 3/0482* | (2013.01) |
| *G06F 3/0481* | (2013.01) |
| *G06T 11/20* | (2006.01) |
| *G06F 3/0488* | (2013.01) |

(52) U.S. Cl.
CPC .............. *G06F 3/16* (2013.01); *G06F 3/0482* (2013.01); *G06F 3/0488* (2013.01); *G06F 3/04817* (2013.01); *G06T 11/206* (2013.01); *G10L 15/26* (2013.01); *G06F 2203/04806* (2013.01); *G06T 2200/24* (2013.01)

(58) Field of Classification Search
CPC ...... G06F 3/16; G06F 3/0482; G06F 3/04817; G06F 15/26; G10L 15/26; G06T 2200/24
See application file for complete search history.

(56) References Cited

U.S. PATENT DOCUMENTS

| | | | |
|---|---|---|---|
| 6,282,362 B1 | 8/2001 | Murphy et al. | |
| 6,829,615 B2 | 12/2004 | Schirmer et al. | |
| 8,726,177 B2 | 5/2014 | Zeringue et al. | |
| 8,923,547 B2 | 12/2014 | Hickman | |
| 2009/0222482 A1 | 9/2009 | Klassen et al. | |

*Primary Examiner* — Pei Yong Weng
(74) *Attorney, Agent, or Firm* — Derek Pressley

(57) ABSTRACT

Wearable audio recorder and retrieval software applications for long term audio and related data recording, visualization, filtering, search, and proof of provenance, providing a record-all and find-later methodology capable of finding audio in multi-year audio data streams. System default state is to record permanently, allowing the user to decide when not to record instead of when to record. User interfaces enable users to retrieve desired recorded audio data by querying other types of recorded data which are related to the desired recorded audio data by way of time and spatial domains.

4 Claims, 13 Drawing Sheets

WEARABLE AUDIO RECORDER AND RETRIEVAL SOFTWARE APPLICATIONS

CROSS-REFERENCE TO RELATED APPLICATION

This application is a continuation of co-pending U.S. patent application Ser. No. 15/352,372 filed Nov. 15, 2016 which application is hereby incorporated by reference.

BACKGROUND

This invention relates to the long term automated collection of audio and data, data normalization, visualization, and ability to find audio both visually and via query in a continuous audio stream that may span years.

Handheld and wearable computing devices have the ability to collect large amounts of diverse data. Low power processing, storage, and radio communications technologies now enable long-term wearable electronic devices in medical and other fields bringing about the creation of devices such as wearable fitness trackers. These devices deal with relatively small data sets and therefore have small storage and computing requirements. Existing devices automatically take photos, the linear progression of which will be a constant photo stream which becomes video. Compression, storage, and efficiency have not reached a level of efficiency necessary to enable permanent wearable video recorders of acceptable quality and size.

Existing audio recorders can be used to record a day of audio. By manually copying mp3 or similar audio files from these recorders to a PC one could create a somewhat continuous audio record. The disadvantages are that it is up to the user to manage the storage and organization of large mp3 files and the user has no method of extracting audio segments relevant to a particular query. For example, if one were to record 1 year of mp3 files using existing recorders, one would have 8760 hours of audio. Existing technologies do not provide the ability to intelligently manage and mine 8760 hours of audio for user-relevant content.

One key aspect of wearable device power optimization is the ability to run data collection and analysis processes on computing devices which are power-optimal for the given process. In order to provide the smallest and longest lasting wearable device it is necessary to maximally offload processing to other more powerful devices. For example, fitness trackers don't implement interfaces for managing data, posting results to social networks, etc. Those power and size intensive functions are offloaded to mobile phones or desktop computers.

As technology progresses to allow for collection a larger variety of data types and data volume, the primary problem becomes one of data mining. Domain specific user friendly data mining tools can provide new and useful possibilities for examining otherwise monolithic and overwhelming data sets and allowing the user to turn that data into actionable information.

Some existing systems address audio recording and geotagging but their implementations have many disadvantages in common. Perhaps the most obvious and fatal disadvantage is that they provide minimal data mining capabilities. Another disadvantage of existing systems is that the user has to make the decision to start recording. Another disadvantage of existing systems is that they employ geotagging mechanisms. Most systems geotag data by (1) adding metadata to the data and (2) thereby creating a data→GPS reference during data collection.

U.S. Pat. No. 6,282,362 considers a geographical position/image capturing system. In addition to the aforementioned disadvantages, the system has other significant disadvantages. The system does not consider the possibility of spatial movement during an audio recording. In addition, there is a single digital recording unit which records GPS and video/audio. The user "may also record audio segments during the image capture by activating suitable control switches or buttons", making audio optional short term secondary data. Furthermore, the system does not have the ability to record audio without recording images, thereby treating audio as secondary data since audio is a short audio clip associated with the user taking a new photo. The system has a single playback unit and the system is a single user/recorder/viewer system. Digital audio data is automatically geo-tagged during image capture. In general, the system depends on "hyper-media links" in order to show an image or play audio. The system only allows selection of data from a map and is "A geographical position/image capturing system". Lastly, the system embeds metadata in an image/audio in order to prove authenticity.

U.S. Pat. No. 8,923,547 defines "Geotagging is the process of adding geographical information to various media in the form of metadata". In addition to the aforementioned disadvantages, the system has other significant disadvantages. Geotagged metadata is added to mp3 files. It creates a fixed image (JPEG/PNG map) which has location information about the audio drawn on it over the map. It considers the possibility of spatial movement during an audio recording and supports showing the path for that recording. However, the system creates a fixed rendering of the entire path of the entire audio recording and there is no mechanism allowing the user to know exactly where one was during a specific time of the recording. The system will make a long term audio recording with map rendering unusable to the user since it will include a myriad of locations which can overlap or repeat at different times over a period of hours or days. It also does not consider recording audio without recording images, or vice versa.

SUMMARY OF INVENTION

One aspect of invention involves systems for audio data recording and retrieval using wearable audio recorders and software applications for managing the recorders and retrieving the recorded audio.

The wearable audio recorders have onboard sensors to collect audio and events that are recorded by an onboard processor which converts collected audio into summary data with a multi-leveled audio sub-sampling process. Onboard memory stores the summary data and the recorded audio and events. An onboard wireless gateway is used to transfer the summary data and recorded audio and events to a software application loaded on a computing device in communication with the audio recorder.

The software applications receive and process the summary data and the recorded audio and events, and then store the processed summary data and processed recorded audio and events in memory accessible through the computing device. A graphical user interface of the computing device is used to graphically display information representing a time interval of recorded audio sought through user input. The displayed information includes a visual representation of the processed summary data for the time interval and simultaneous visual representation of the processed events occurring during the time interval which are positioned with the summary data representation in a time-coinciding relationship. Changes are made to the visual representations in real-time in response to user input, audio playback, or change in data or events.

One embodiment of the system uses one software application adapted more particularly for smaller displays such as those used in wireless mobile devices, and another software application configured for use on more powerful computers with larger displays. Different embodiments of this second application display additional information regarding the sought time interval of audio, such as visual representation of transcribed written text or visual representation of the location in which the recording was made shown on a geographic map.

Another aspect of invention involves computer software applications taking the form of a non-transitory computer-readable medium having instructions which, when executed on a computer, perform audio processing and retrieval methods. One of these methods includes the instructions to collect recorded audio data and multiple types of time-stamped recorded events. A graphical user interface of the computer is used to simultaneously display visual representation of the recorded events and a linear visual representation of a time interval of recorded audio data sought through user search input of said multiple event types. The time interval representation is positioned with the events representation in a time-coinciding relationship. The visual representations change in real-time in response to user input, audio playback or change in data or events.

Different embodiments of these software applications may be configured to include additional or different instructions. One embodiment of the method further includes processing said recorded audio into summary data with a multi-leveled audio sub-sampling process and displaying visual representation of said processed summary data for said time interval. Another embodiment may be adapted for larger, more powerful devices and includes the instructions to display additional information regarding the audio, such as visual representation of transcribed written text or visual representation of the location in which the recording was made shown on a geographic map.

BRIEF DESCRIPTION OF DRAWINGS

Further features and advantages of the invention will become apparent to those of skill in the art after reading the following detailed description in conjunction with these appended drawings.

DETAILED DESCRIPTION OF A PREFERRED EMBODIMENT

Figure 1:
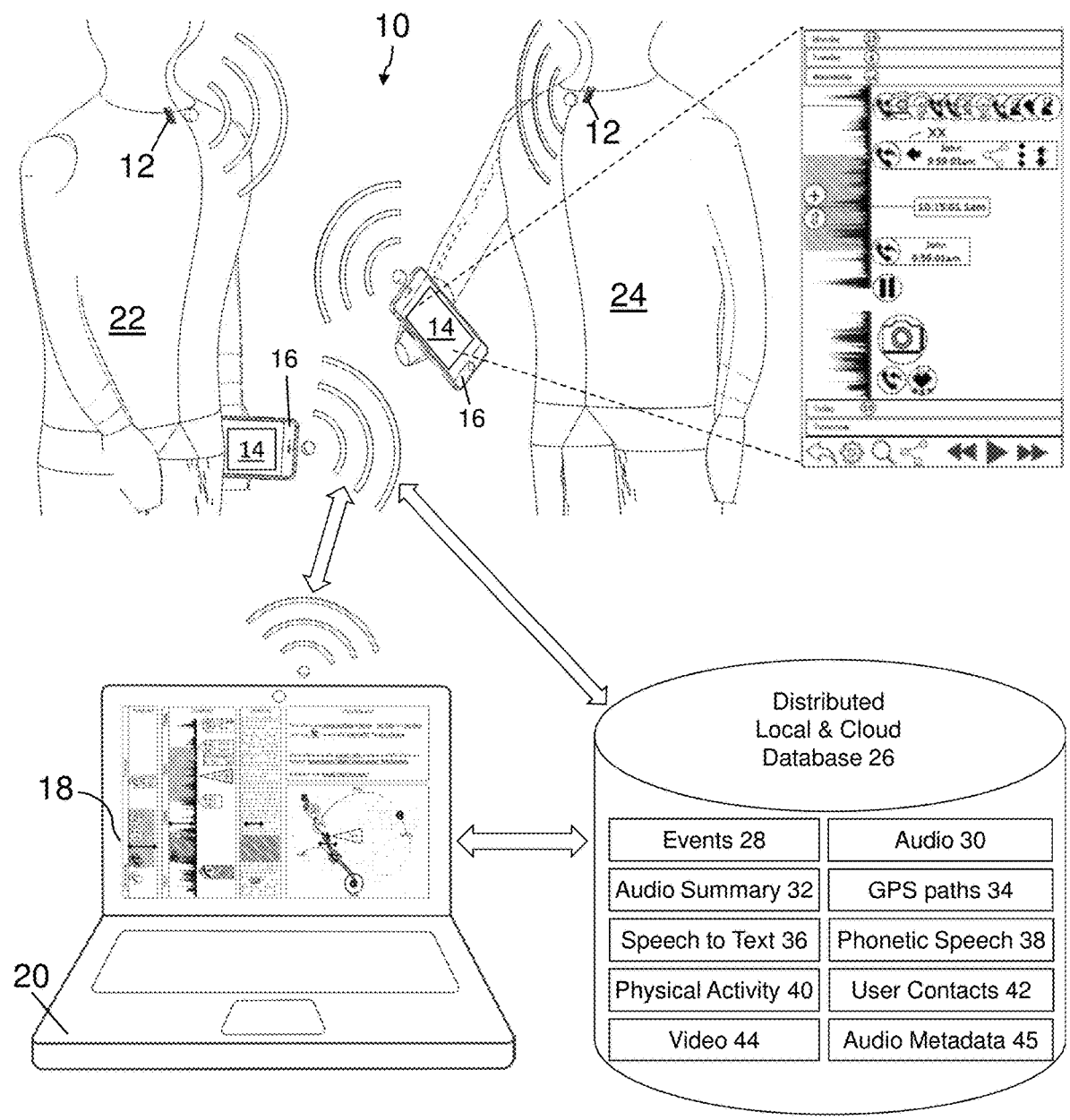
FIG. 1 shows a system for audio and related data recording, processing, archival and retrieval according to the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further application of the principles of the invention illustrated therein being contemplated as would normally occur to one skilled in the art to which the invention relates.

FIG. 1 shows a preferred embodiment of a system for audio and related data recording, processing, archival and retrieval according to the invention that may be used to systematically archive large time periods of audio (sound) recordings to create a substantially continuous long-term audio record. The major components of system 10 include wearable audio recorder 12, mobile software application with user interface 14, operating on a smartphone or similar mobile device 16, and a processing, archive and retrieval (or P.A.R.) software application with user interface 18, operating on a typically less mobile base computer 20 with a larger display, greater processing capacity, and larger power and data storage resources, such as a desktop, laptop or tablet computer, for example. System 10 may be used by one or more users 22, 24 wearing recorders 12 to record audio data and using mobile application 14 operating on smartphones 16 that record other data which coincides with the audio data recordings. The recorder, when taking the form as shown, can be attached to their clothing with a clip shown in FIGS. 3 and 4, for example. It is contemplated that recorder 12 can take other forms, such as being incorporated into a ring, wrist band, necklace or key chain, for example, and that 3rd party audio recorders may participate in the system, using metadata from 3rd party audio files to automatically import audio for the correct time range.

Wearable audio recorder 12 has the capability to record and store onboard one full week's worth of audio data. Recorder 12 and mobile application 14 are set to always record unless explicitly paused by the user. If retrieval of recently recorded audio data is desired during this time period, mobile application 14 can be used to filter, search, retrieve and play back audio stored on Bluetooth-paired recorder 12, making use of other data gathered by mobile device 16 to aid in finding and retrieving desired audio.

After an extended period of time has taken place, such as the aforementioned week-long time period, and/or the data storage on board recorder 12 is substantially full, and/or battery power is running low, recorder 12 can be connected via USB, or other similar type of connection, to base computer 20 to recharge its battery and transfer data from recorder 12 to a database accessible through base computer 20 for archival with use of the PAR software application 18. Wireless data transfer and recharging of recorder 12 is also contemplated as another means of accomplishing these same functions. In a similar fashion, mobile application 14 may also transfer collected data to the database through use of the archival and retrieval application. In a preferred embodiment of the system, collected data transfer from the mobile device to the database is accomplished via a Wi-Fi connection. It is contemplated, but perhaps less preferable, that the data transfer from mobile device 16 may also be accomplished via various types of corded connections. PAR application 18 imports recorder and mobile device data into database 26, after which the user may visualize, filter and search the data. This process can be carried out weekly for years, providing the user with a substantially continuous and complete archive of audio and data from which to retrieve and/or data mine information. It is contemplated that certain embodiments of the system may additionally record video in addition to the other aforementioned types of data.

System 10 automatically collects several datatypes. Events 28 are timestamped occurrences which may optionally have an interval. Audio 30 is the audio recording made by recorder 12. Audio summary 32 is a heavily subsampled representation of the audio stream that is used to visualize audio. GPS paths 34 are the time stamped spatial paths traveled by users 22, 24. Speech to text 36 is the result of automated or manual speech to text conversion of the entire audio dataset. Phonetic speech 38 is the metadata calculated for phonetic speech search. Physical activity 40 is the recorded physical activity of user or users 22, 24. User contacts 42 is data such as name and phone number which is associated with phone call or other events. Audio metadata 45 is data which is inserted in the audio stream in order to store various information such as time stamps, user input to recorder 12 or user interfaces of applications 14 and 18, audio sample rate and amplification volume changes etc.

Events 28 can represent a variety of data:
1) User-created bookmark, idea, and meeting events can be created through user interfaces 46 (See FIG. 2), user interfaces of applications 14 and 18.
2) User proximity events can be generated automatically based on detecting Bluetooth proximity with another user's recorder 12 or mobile device 16.
3) Calendar and meetings events can be generated automatically through connection to the back-end calendar service provider such as Google calendar.
4) Phone call events can be generated automatically from phone call logs including VOIP calls.
5) Photo and video events are generated automatically from phone and computer photo and video databases. Video events span the length of the video.
6) Pause events are generated when the user pauses recording and span the length of the pause period.
7) Sleep events are generated in response to sleep detection.
8) Dynamic events are generated automatically in response to queries (e.g. search for a speech to text word result) and are not stored in the database.

Events 28 may also contain various metadata. E.g. star ratings can be assigned to events and notes and hash tags can be added to events. Some events are not designed for end-user consumption and therefore not normally visualized. These internal events include:

9) Time zone events, which are used to keep track of when a user crossed into different time zones. These events are used to automatically show user data in their local or otherwise specified time zone.
10) Grouped events are a run-time optimization which dynamically groups events together in order to avoid user interface clutter.

Some collected data such as user contacts are not timestamped. A user bookmark may have an end time if the user specifies an event interval. A calendar meeting event will typically have a span as specified in the user's calendar. Some events may be generated from compound input. E.g. A bookmark event may be created by entering a generic bookmark command to recorder 12 and adding a voice command such as "file as work" which specifies the type of bookmark to assign to the bookmark.

Figure 2:
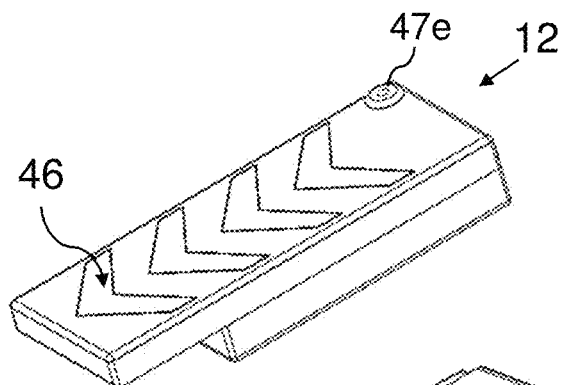
FIG. 2 is a perspective view of the front of a preferred embodiment of a wearable audio recorder according to the invention.
Figure 3:
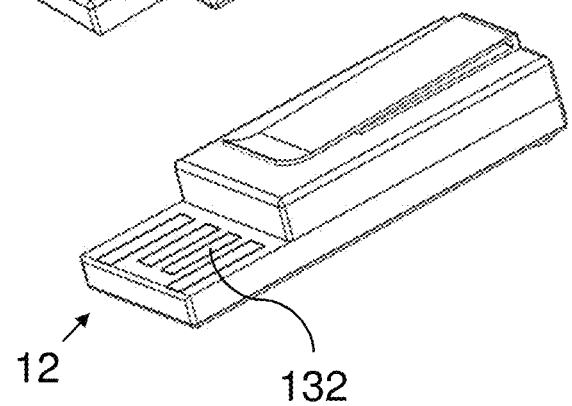
FIG. 3 is perspective view of the back of the recorder of FIG. 2.
Figure 4:
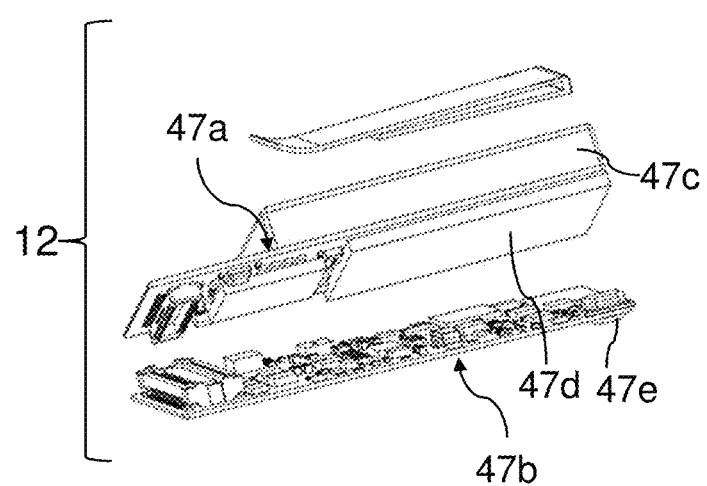
FIG. 4 is a perspective, partially-exploded view of the recorder of FIGS. 2 and 3.

FIGS. 2-4 show a preferred embodiment of a wearable audio recorder 12 that may be used in the system of FIG. 1. FIG. 4 shows a pair of printed circuit boards 47a and 47b are layered together with the battery compartment 47c and NAND flash memory chip 47d sandwiched between them. The boards preferably have high quality conformal coating and may have additional glass or similar touch-sensor film. Plastic material is injection molded between the printed circuit boards to form the final device as shown in FIGS. 2 and 3. A microphone water proofing port 47e preferably consists of a sound-transparent film suspended above the microphone cavity to achieve a waterproof design.

Figure 5:
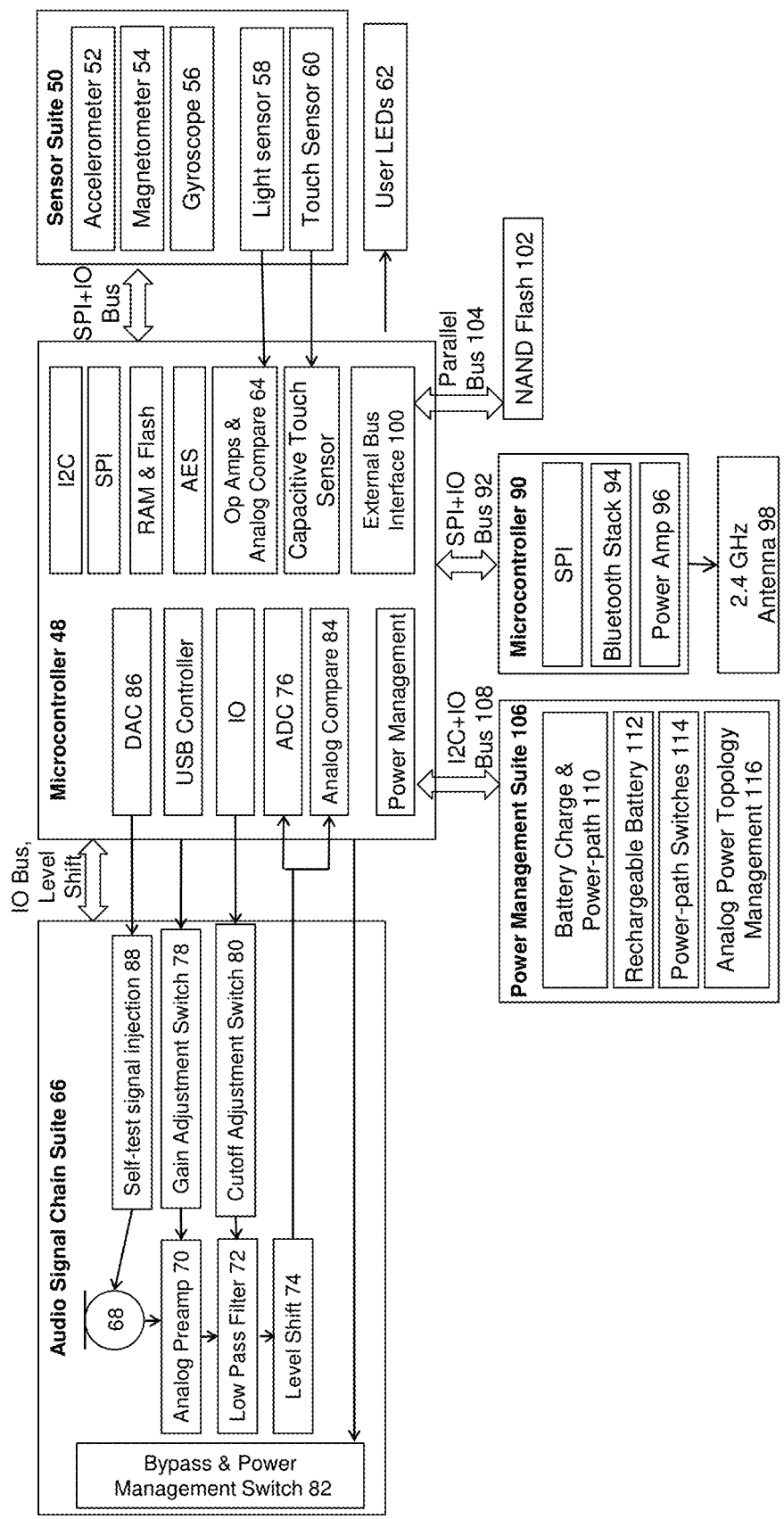
FIG. 5 is a block diagram of the major components of the recorder of FIGS. 2-4.

FIG. 5 is a block diagram of recorder 12's major components. A processor 48, such as a microcontroller from the EFM321M Gecko 32-bit family sold by Silicon Labs of Austin, Tex. that can be found at http://www.silabs.com/products/mcu/32-bit/efm32-gecko/Pages/efm32-geck-o.aspx, or other similar suitable microcontroller, interfaces with a suite of collection sensors 50. Suite 50 is shown as including accelerometer 52, magnetometer 54, gyroscope 56, light sensor 58, and capacitive touch sensor 60. It is contemplated that other types of sensors and sensor combinations can be used within the scope of the invention to achieve one or more of the overall goals of the invention. Light sensor 58 can use one of user LEDs 62 combined with op-amps & analog compare 64 in order to provide low power light sensing and wake from low power states without the use of additional components. Processor 48 also interfaces with audio signal chain suite 66.

Suite 66 is shown as including an audio collection sensor 68 (such as an analog microphone, for example) which sends a low-level audio signal into analog preamp 70. The audio signal then passes through $4^{th}$ order low pass filter 72, through level shift 74 and into ADC 76. Processor 48 controls sound level through gain adjustment switch 78 and $4^{th}$ order low pass filter 72 through cutoff adjustment switch 80. ADC 76 sample rate is continuously varied to minimize power consumption. Bypass & power management switch 82 is used to partially or wholly power down analog domain circuits and bypass circuits. E.g. analog preamp 70 and $4^{th}$ order Nyquist low pass filter 72 may be powered down and bypassed in order to provide a low-level audio signal to Analog Compare 84 for the purpose of waking processor 48 from a low power state. Alternatively, for higher sample rates, combined microphone 68 and analog preamp 70 roll-off may be sufficient to power down and bypass $4^{th}$ order Nyquist low pass filter 72. DAC 86 can send a test signal to self-test signal injection 88 for the purpose of field and production analog circuit self-test. Processor 48 communicates with processor 90, such as an Nrf5 1 series microcontroller from Nordic Semiconductor of Oslo, Norway that can be found at http://www.nordicsemi.com/eng/Products/Bluetooth-low-energy/nRF5 1 822, with custom firmware via SPI and IO bus 92. Bluetooth Stack 94 communicates with mobile phone 16 and base computer 20 via Power Amp 96 and 2.4 GHz antenna 98.

External Bus Interface 100 communicates with NAND flash 102 via parallel bus 104. Processor 48 communicates with power management suite 106 via I2C and IO bus 108. A battery charge management solution, such as the BQ25120 from Texas Instruments Incorporated with information available at http://www.ti.com/product/bq25120, & power-path 110 manages rechargeable battery 112. Power-path switches 114 control a variety of power optimizing features. E.g. some components such as processor 90, NAND flash 102, and analog signal chain 66 can be powered off completely. Recorder 12 and mobile device 16 may utilize an interval time rendezvous-based connection scheme which allows processor 90 to be powered up only in response to timed rendezvous or user input. E.g. under normal recording operation conditions Bluetooth may be powered off permanently and recorder 12 will connect to mobile device 16 only when requested by the user or when the next timed rendezvous occurs Analog power topology management 116 can configure the system power supply such that audio signal chain 66 is placed in parallel or in series with processor 48. Serial mode allows shared current of analog and digital circuitry, further reducing power consumption. Parallel mode allows for battery charge & power-path switching regulator to be used to efficiently power the system in a high-power state during which most sub-systems are powered up. Note that functionally equivalent algorithms could be implemented using an FPGA or ASIC or by combining processor 48 and 90 into a single processor. Also, Audio signal chain suite 66 could be implemented using digital microphone and filtering implementations.

Figure 6:
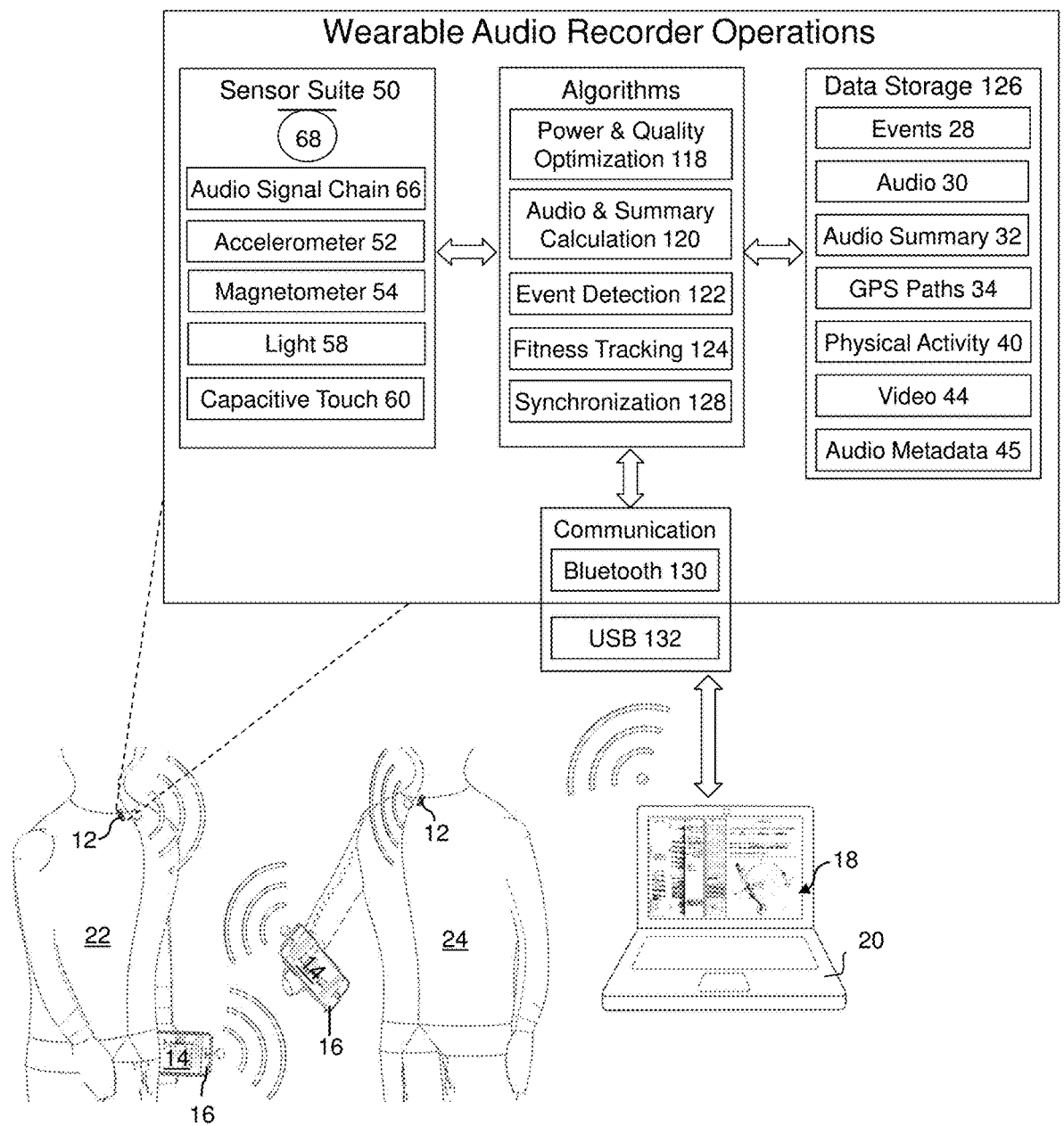
FIG. 6 is an operating diagram for the recorder of FIGS. 2-4.

FIG. 6 shows wearable audio recorder 12 operations. Users 22, 24 interacts with recorder 12 via one or more sensors in collection sensors suite 50 or phone application 14 via Bluetooth 130. Power & Quality Optimization Algorithm 118 and Algorithms 120, 122, and 124 use highly power efficient algorithms to convert sensor data streams into suite data storage 126 which contains a subset such as 28, 30, 32, 34, 40, 44 and 45 of distributed local and cloud database 26 (FIG. 1) data types and which is stored in NAND flash 102 (FIG. 5), internal NOR flash, and SRAM (block representations not shown). Event Detection 122 uses user interface 46 which consists of capacitive touch 60, Accelerometer 52 and Magnetometer 54 to generate time-stamped events 28. Fitness Tracking 124 may use various sensors to calculate fitness tracking data physical activity 40. Synchronization 128 ensures that data is synchronized between mobile application 14, Audio Recorder 12, and PAR application 18. Data may be transferred to/from mobile application 14 and PAR application 18 via communications modules Bluetooth gateway 130, and USB 132. Turning back to FIGS. 2 and 3, recorder 12 incorporates one embodiment of a USB connection 132, user interface 46 and audio collection sensor (microphone) 68.

Figure 7:
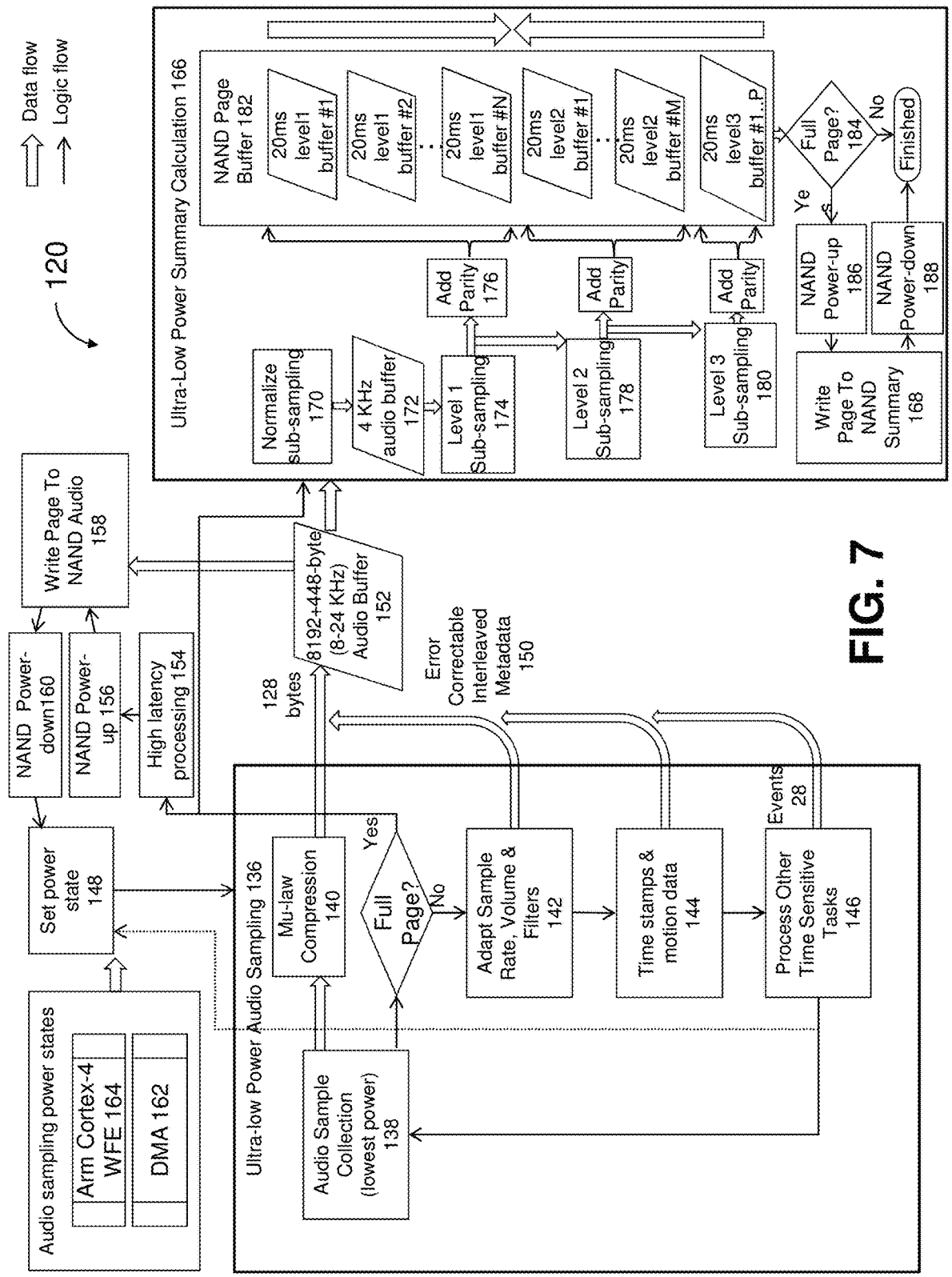
FIG. 7 is a flowchart detailing audio sampling and summary calculation algorithms that may be used by the recorder of FIGS. 2-4.

FIG. 7 shows a flowchart detailing audio sampling and audio summary calculation operations 120 which stores audio stream 30 and audio summary data 32. Audio summary data 32 is a subsampled set of audio stream 30 which can be used to efficiently visualize Audio Summary visual representation 134 in FIG. 14, and which can be efficiently transferred from audio recorder 12 to mobile application 14 using Bluetooth without transfer of the actual audio stream 30. Different subsampled resolutions may be calculated in order to efficiently transfer and render Audio Summary visual representation 134 for time intervals of between 30 seconds and several days. Note that different subsampling algorithms may be used to fulfill system requirements.

Ultra-low power audio sampling suite 136 is responsible for audio samples collection (lowest power) 138 which collects 128-byte audio samples at the lowest possible power. Mu-law compression 140 converts the 128-byte audio samples into 8-bit format. Adapt sample rate, volume & filters 142 adjusts audio signal chain 66 according to the current audio quality requirements. Time stamps & motion data 144 inserts additional metadata into the audio stream. Process other time sensitive tasks 146 handles tasks which need high time resolution such as creating events 28 in response to user touch and may pre-empt ultra-low power audio sampling suite 136 in order to set power state 148. Audio Mu-law compression 140 output and error correctable interleaved metadata 150 is appended to 8192+448-byte (8-24 KHz) audio buffer 152. If metadata 150 was appended, thereby crossing into the next 128-byte sample buffer, fewer audio samples are collected in order to maintain the 128-byte sample boundary. Audio Buffer 152 can contain multiple audio sample rate transitions which are demarked by error correctable interleaved metadata 150. For minimal power consumption, no error detection or correction data is calculated for the audio samples and the full NAND page, including spare area, are used for storage. When the buffer is full, high latency processing 154, NAND power-up 156, write page to NAND audio 158 and NAND power-down 160 execute.

Set power state 148 determines if ultra-low power audio sampling power state suite 136 needs to be modified. Power state DMA 162 utilizes relatively expensive DMA based audio sample collection. Arm cortex-4 WFE 164 is much lower power and is used to power down most of the processor core while waiting for audio samples. Power state 148 can be switched at any 128-byte sample boundary. E.g. if the user starts streaming audio to mobile application 14 or if a burst of audio summary data is requested by mobile application 14, power state DMA 162 will be used because audio compression and transfer processes prevent the use of power state Arm cortex-4 WFE 164. Some optimizations are not depicted for clarity. E.g. while write page to NAND audio 158 is waiting for NAND page write to complete, summary calculations can be performed.

Ultra-low power summary calculation suite 166 is responsible for NAND summary page writing 168. This summary data is used for real-time transfer of a visual representation of audio of any resolution to mobile application 14. For power and speed optimization, this data is pre-calculated with a multi-leveled sub-sampling process and stored during audio recording. This is necessary because users 22, 24 may request to view an entire day of audio on mobile application 14. Without pre-calculation it would be very power-intensive and time consuming to calculate audio summary from 1 full day of audio. Additionally, it is not practical to transfer the actual audio for an entire day via Bluetooth. When a full NAND page of audio is collected, normalize sub-sampling 170 converts the 8192+448-byte audio buffer 152 into a sample rate-normalized 4 KHz audio buffer 172. Level 1 sub-sampling 174 sub-samples that buffer to a level that is sufficiently detailed in order to display 30 seconds of audio summary data when user 22, 24 maximally zooms to a moment in time. Add parity 176 efficiently converts 8-bit summary samples to 6-bit+2-bit parity, allowing NAND summary data storage to be done without power-expensive error correction algorithms. Level 2 sub-sampling 178 further sub-samples audio summary samples. Level 3 sub-sampling 180 further sub-samples to a resolution from which one can efficiently calculate a I-day audio summary which might be displayed on a 2000 pixel tall screen. Note that Sub-sampled data is added to NAND page buffer 182 by appending Level I data from the top, and appending level 2 & 3 data from the bottom. This avoids interleaving different levels on a flash page, further reducing power consumption when reading summary data of a given level.

Finally, full page 184 writes the buffer to NAND by performing NAND power-up 186, NAND summary page writing 168. Power usage is minimized by returning to NAND power-down 188. Summary sub-sampling may use different algorithms depending on level. E.g. for level 3, using peak values would cause visualization to show very high audio levels even when only brief moments for a given pixel were loud. Therefore, averaging may be appropriate for level 3 visualization. Level I visualization on the other hand is used for zoomed-in audio viewing and using the maximum audio sample for each pixel may provide a better visualization.

Figure 8:
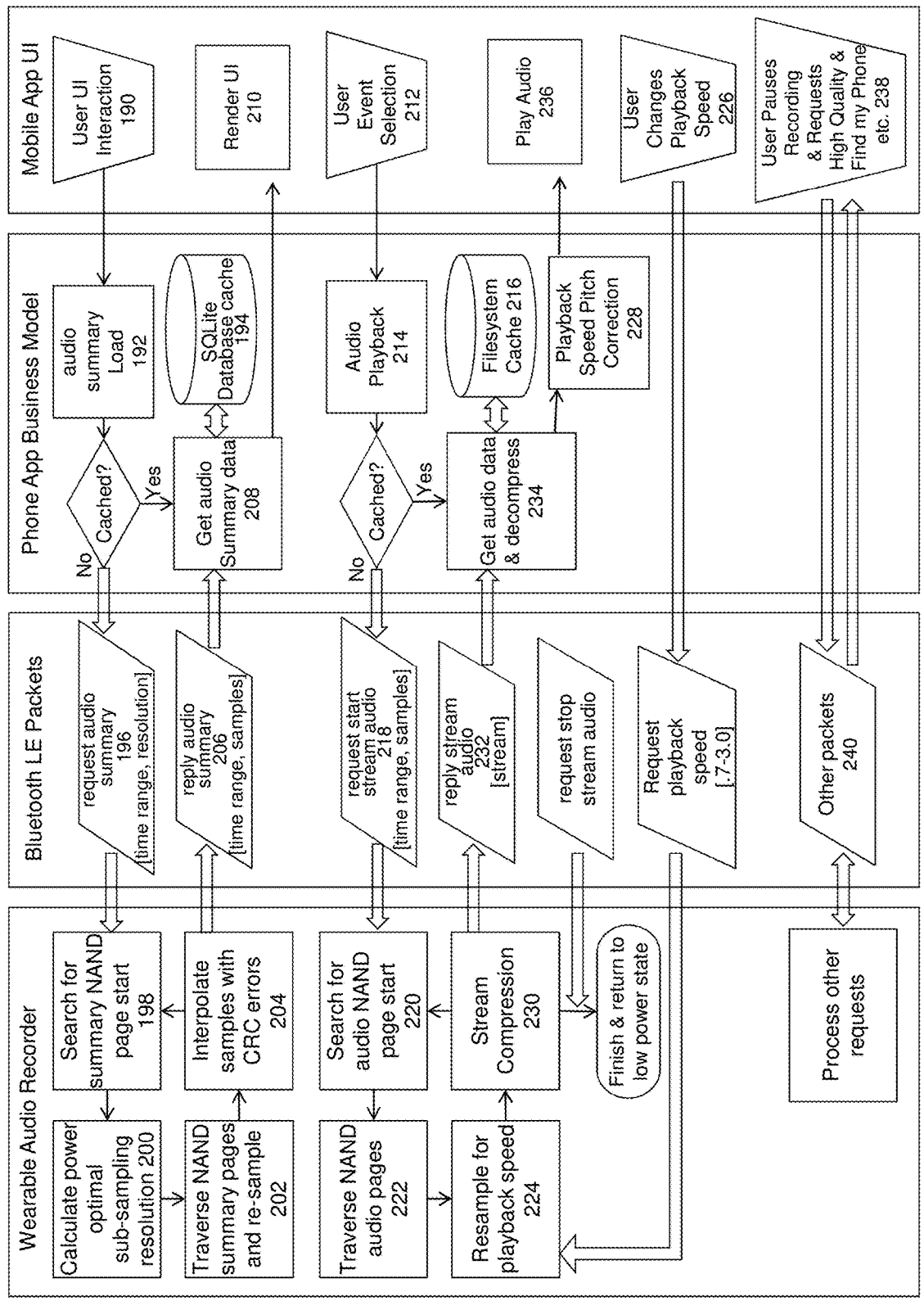
FIG. 8 is a flowchart detailing audio and summary data transfer algorithms that may be used by the recorder and mobile application of FIG. 1.

FIG. 8 shows a flowchart of a method of audio & summary transfer that may be used to manage the streaming of audio from wearable audio recorder 12 to mobile application 14, as well as the transfer of audio summary data from wearable audio recorder 12 to mobile application 14 for the purpose of visualizing the audio timeline at zoom levels of 1 day down to 30 seconds.

User UI interaction 190 can trigger audio summary load 192. If the summary data is not cached in SQLite database cache 194, Bluetooth request audio summary packet 196 is sent to wearable audio recorder 12's search for summary NAND page start 198. Calculate power optimal sub-sampling resolution 200 determines the power and visual optimal resolution at which to provide summary data. For example, if the summary visualization on phone 16's screen spans 1000 pixels, a 1000 sample summary set would be visually optimal. However, level 2 summary data might have an equivalent resolution of 800 pixels. Since higher summary levels represent much smaller data sets, it will be more power optimal to use level 2 data and generate 800 data points which will still be visually appealing when rendered across 1000 screen pixels. In this case traverse NAND pages and re-sample 202 reads the relevant flash pages for level 2 without down-sampling. Interpolate samples with CRC errors 204 is a highly power efficient mechanism for removing visual artifacts which might be caused by flash bit errors. The resultant reply audio summary 206 Bluetooth packets are transmitted to get audio summary data 208 which will update the SQLite database cache 194 and render UI 210. Conversely, a high resolution level may be down-sampled for a 4000 pixel tall screen.

User event selection 212 and other UI interactions can trigger audio playback 214. If filesystem cache 216 does not contain the given audio, request start stream audio 218 is sent via Bluetooth to search for audio NAND page start 220. Traverse NAND audio pages 222 collects the audio. Resample for playback speed 224 implements a power efficient mechanism for changing playback speed without requiring increased transfer data rate. For example, user changes playback speed 226 to 2×, simple decimation may be used because it is power-optimal and the resultant audio stream can be passed through playback speed pitch correction 228 with minimal audible artifacts such as aliasing. Stream compression 230 is used to minimize Bluetooth LE transfer data rate when sending reply stream audio 232 to get audio data & decompress 234, and thereby minimize power consumption and transfer bandwidth limitations. During playback 236, a mix of streamed and cached audio may be played depending on what is available in the cache at the current playback position. To minimize wearable audio recorder 12's power consumption, summary and audio data is only transferred as needed.

Finally, user pauses recording & requests high quality & find my phone etc. 238 can trigger various other Bluetooth packets 240 to be exchanged. Other packets may include a command given to recorder 12's user interface 46 (FIG. 2) to:

(1) trigger photo capture on phone 16;
(2) skip to the next media player song on phone 16;
(3) turn on the screen and open mobile application 14 on phone 16;
(4) add a bookmark event, which will appear dynamically if the mobile application 14 is open;
(5) control phone media volume; or
(6) answer an incoming phone call.

Figure 9:
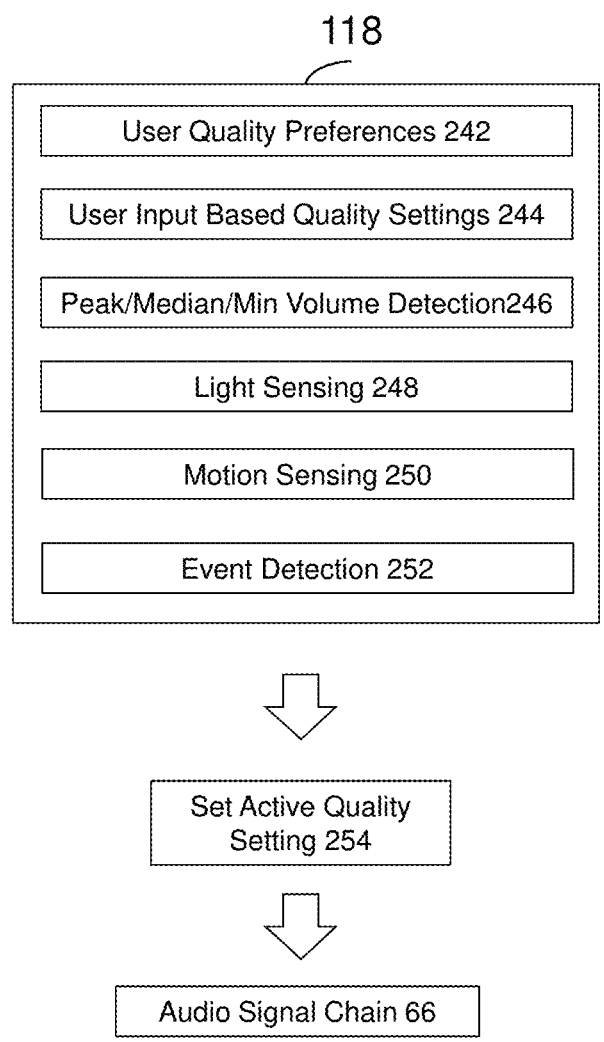
FIG. 9 is a flowchart detailing a power and quality optimization algorithm that may be used by the recorder of FIGS. 2-4.

FIG. 9 shows wearable audio recorder power & quality optimization 118 which is preferably used by wearable audio recorder 12. It dynamically adapts audio signal chain 66 to current recording quality requirements and inserts inline change metadata into audio & metadata stream 45. User Quality Preferences 242 include a variety of settings, including changing audio quality during meetings, phone calls, spatial location, user proximity, time of day or day of week, light sensor, motion sensor, or user event creation. User Input Based Quality Settings 244 allows the user to manually force a given quality. Measurements Peak/Median/Min Volume Detection 246, Light Sensing 248, Motion Sensing 250, Event Detection 252 all feed into Set Active Quality Setting 254 which adjusts audio sample rate and amplification, and can optionally power down parts or all of audio signal chain 66. A degenerate case of setting audio sample rate to 0 means that recording is paused. The user may request that recording is paused for a period of time after which it automatically un-pauses. Automatic pausing can also be the result of low volume audio in combination with time of day, motion, light etc. Pausing may be applied to all data or individual data types.

Figure 10:
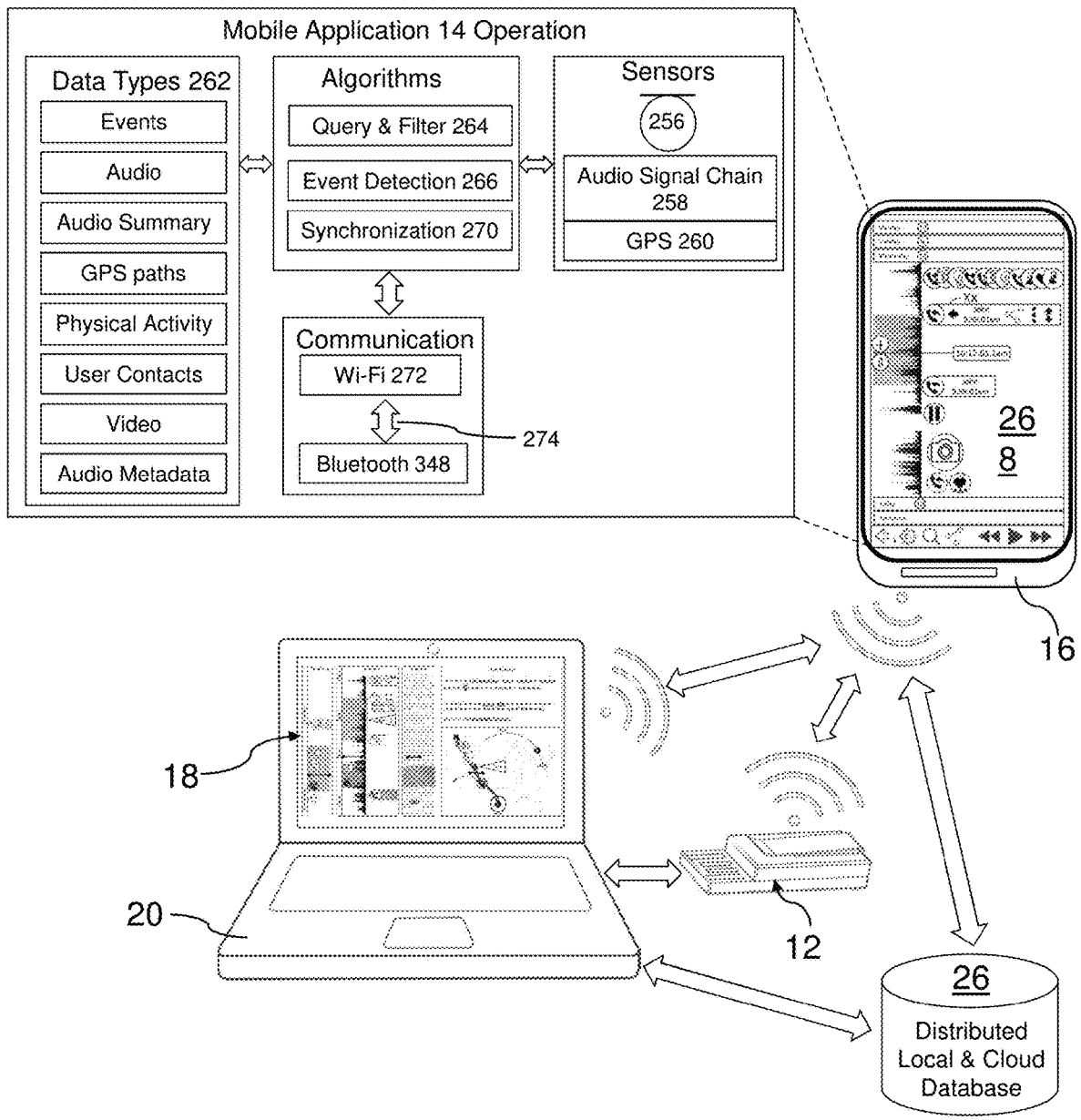
FIG. 10 is an operating diagram of a mobile software application that may be used in the system of FIG. 1.

FIG. 10 shows an operational block diagram of mobile application 14 that may be used in the system of FIG. 1. Mobile Phone 16 contains sensors 256, 258, 260, but may optionally contain one or more sensors shown in recorder 12. Suite data types 262 represents data types which are produced and queried on phone 16. Distributed local & cloud database 26 represents the local or shared database used to store data. It may consist of SQL and blob type storage and the user may choose to store this data locally on phone 16 or in the cloud. If stored in the cloud, multiple clients including computers and phones can access and visualize the data. Query & filter 264 allows the user to visually filter event data. Event Detection 266 generates a variety of events including phone call, calendar, user proximity, user bookmark, and photo events which can be visualized and searched in User Interface 268. Synchronization 270 ensures that all data is synchronized between recorder 12, mobile application 14, and PAR application 18. This includes all data shown in database 26. Mobile application 14 may communicate with PAR application 18 via Wi-Fi 272 or bridged connection 274 which uses recorder 12 as a message router between applications 14 and 18.

Figure 11:
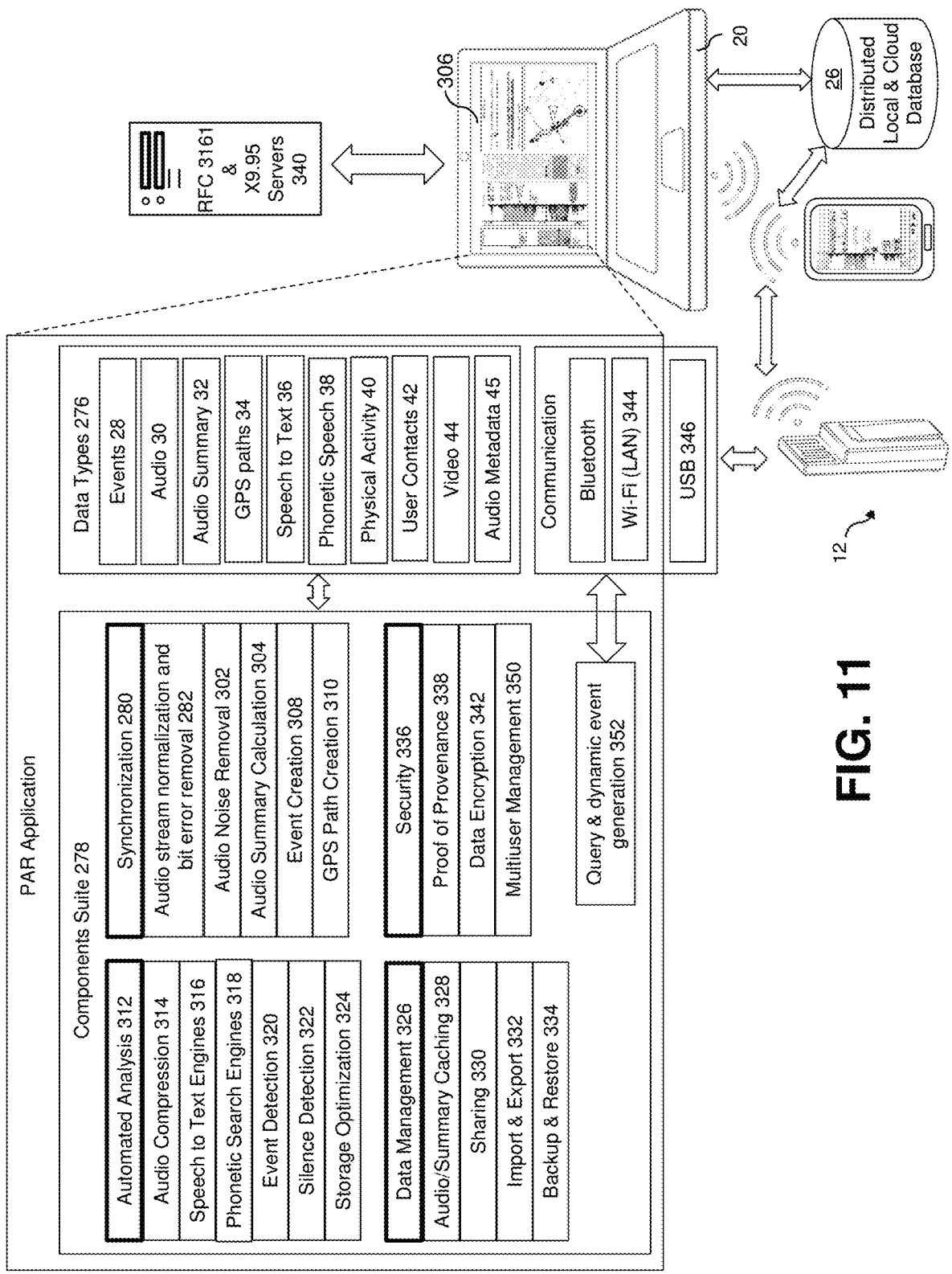
FIG. 11 is an operating diagram of a processing, archival and retrieval (P.A.R.) software application that may be used in the system of FIG. 1.

FIG. 11 shows an operational block diagram of a Processing, Archival, and Retrieval (P.A.R.) application 18 which may be used in the system of FIG. 1. Suite data types 276 represents data types 28, 30, 32, 34, 36, 38, 40, 42, 44, 45 which are produced and queried in PAR application 18. Distributed local & cloud database 26 represents the database used to store data. It may consist of SQL and blob type storage and the user may choose to store this data locally on computer 20 or in the cloud. If stored in the cloud, multiple clients including computers and phones can access and visualize the data. Components suite 278 provides a larger set of algorithms than mobile application 14 due to the greater computing power and screen size of base computer 20.

Figure 12:
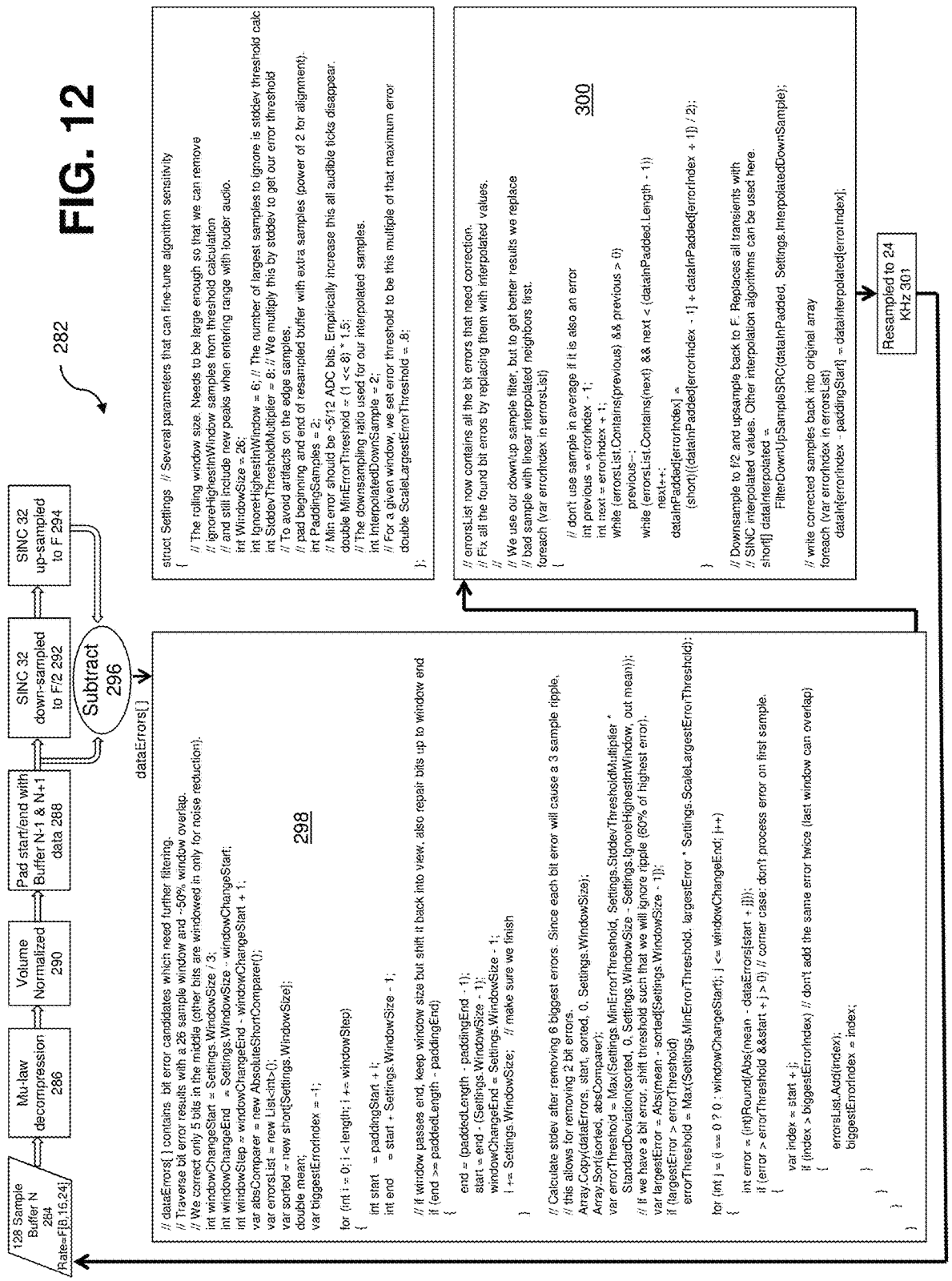
FIG. 12 is a diagram of an audio stream bit error removal algorithm that may be used by the mobile application of FIG. 10 and the PAR application of FIG. 11.

Sub-suite Synchronization 280 contains various algorithms which are used during importation of recorder and phone audio and data into distributed local & cloud database 26. Audio stream normalization and bit error removal algorithm 282 is detailed in FIG. 12. The most important aspect of this algorithm is to avoid the use of NAND error correction hardware or software algorithms when writing audio data to recorder 12 NAND flash memory 102 (FIG. 5), thereby contributing to the ultra-low power recorder design and small size while allowing for use of MLC or TLC NAND flash. Audio data is simply written to flash without the need of error encoding computation or data space. Algorithm 282 is capable of removing audible single and dual bit errors from the recorded audio stream with minimally audible artifacts. 128-byte buffer N 284 with a sample rate ranging from 8 to 24 KHz may be pre-pended with metadata such as volume level and sample rate changes, thereby signifying a configuration change to audio signal chain 66 in FIG. 5 starting with this buffer. The audio bytes of the buffer pass through mu-law decompression 286. The buffer then passes through pad start/end with Buffer N−1 & N+1 data 288 to avoid artifacts at buffer boundaries. It is then volume normalized 290, SINC 32 down-sampled to F/2 292 and SINC 32 up-sampled to F 294. Subtract 296 is then used to generate an array of possible bit errors which has most non-error energy removed. This then passes through pseudo-code 298 and pseudo-code 300, is resampled to 24 Khz 301 which produces the final error-corrected 24 Khz audio stream. The Algorithm is repeated for the next 128-sample buffer N 284. Note that buffer lengths and filter settings are for demonstrative purposes and may be varied based on requirements. The reason for processing 128 sample buffers at a time is that recorder 12 may vary the sampling rate and audio amplification at 128 sample intervals. Lowering sampling rate when possible allows for the lowest possible power consumption, and varying audio amplification is used to maximize dynamic range while avoiding clipping artifacts. Note that SINC 32 macro operations may be replaced with mathematically similar operators.

Turning back to FIG. 11, audio noise removal 302 consists of first calculating a noise profile through frequency domain analysis of a segment of "noise" audio, and then real-time frequency domain removal of detected noise profiles in an audio stream. Two profiles are used during recorder 12 to PAR application 18 audio transfers:

1) Hiss removal is a profile calculated using recorder 12 self-noise; and
2) Thump removal is calculated using pre-recorded noise generated by tapping on recorder 12 touch sensor with a finger.

Both of these noise removal profiles are applied to the audio stream. Hiss removal allows for low-power recorder hardware design while giving the user a "black" audio background similar to much larger audio recorder hardware. Thump removal is critical in a wearable audio recorder because these noises can damage a user's ears and because simple high pass filtering is ineffective at removing thumps without audible artifacts.

Audio summary calculation 304 is similar to ultra-low power summary calculation 166 in FIG. 7 except that the summary data is stored directly in a database instead of NAND. This data is recalculated by computer 20 because a large screen user interface 306 supports different zoom levels than the mobile phone and because no error correcting schemes need to be applied to the resultant data.

Event creation 308 is responsible for the conversion of recorder 12 audio stream metadata into events such as bookmarks. E.g. swiping of the finger on recorder 12 inserts UI interaction data into audio metadata 45 which might be mapped to a "bookmark" event. Different swipe patterns may be defined to map to different event types. For example, swiping up might create a bookmark, double swipe up might create a bookmark start until a double swipe down is detected. Other commands such as single swipe down might be sent directly from recorder 12 to mobile application 14 via Bluetooth and would not require further processing in event creation 308. It also obtains event from mobile application 14.

GPS path creation 310 obtains GPS data from mobile application 14 and performs noise removal, path simplification and speed calculations and stores the resultant data in GPS paths 34.

Sub-suite Automated Analysis 312 contains modules responsible for post-synchronization automated processing. Because these modules represent compute-intensive long-running algorithms, they are architected to be pausable and can continue execution after application start. Audio compression 314 is the process which automates compression of the audio stream with the purpose of efficient storage. The audio stream is segmented into Opus or other audio file blobs which are then stored in distributed local & cloud database 26. Speech to text engines 316 represents one or more $3^{rd}$ party plug-in engines which are abstracted into an application-standard API. These engines are used for the automatic transcription of the entire audio stream and generate speech to text data 36. Note that an engine may also integrate with human-based manual transcription services. Phonetic search engines 318 are also $3^{rd}$ party plug-in engines and allow for the pre-calculation of phonetic search metadata which later allows the user to perform phonetic speech search. The engines produce phonetic speech data 38.

Event detection 320 is similar to event creation 308 and can perform detection of events which are defined by audio input. E.g. the user might say "file as work" while holding a finger down on recorder interface 46 (See FIG. 2) through touch sensor 60 (See FIG. 5). Placement of a finger on touch sensor 60 inserts user interface interaction data into audio metadata 45 which represents an audio voice command. "File as work # meeting" could be translated into creating hierarchical hash tagged note "# work # meeting" for an event. Various commands such as "File as YYY", "Event start", "Event end", "Star rating 3" may be used. Due to the windowed command nature created through touch sensor 60, these commands can be translated using a fixed grammar and are thereby robustly translated into event data 28. It is contemplated that event detection 320 may also run on mobile application 14 in order to give the user earlier access to the results without synchronization to PAR application 18.

Silence detection 322 may be used to automatically detect audio segments of relative silence which can be used for later automated noise removal based on current background noise conditions. For increased speech and phonetic engine accuracy, noise removal may be applied to audio before being processed through other engines.

Storage optimization 324 can be configured to automatically compress older audio data using higher compression ratios.

Sub-suite Data Management 326 contains audio/summary caching 328 which allows queries to run against locally cached data when using cloud based storage. This avoids the constant transfer of large audio files from the cloud for the purpose of playback. Sharing 330 allows for sharing audio or video slideshows as well as text with third parties such as Facebook. Import & export 332 allows for import from $3^{rd}$ party audio recorders as well as export of various data types. Backup & restore 334 support backup and data migration scenarios.

Sub-suite Security 336 handles proof of provenance 338 which involves proof of audio provenance by means of trusted timestamping mechanism such as PKI-based or linking-based schemes found in RFC 3161 or X9.95 timestamping servers 340. A timestamped hash is calculated for a data block (audio, events, GPS etc.), and is stored for later proof that the data block was not later modified. Furthermore, for further proof of provenance, the hash calculation may include other metadata such as unique audio recorder identifier (including $3^{rd}$ party recorder identifier), hardware MAC addresses, and username and license key. The user may prove provenance of one or more data types for a given time span, both individually or in combination. Button 390 in FIG. 13 may be used to check for proof of provenance of a given range of data and displays a checkmark if all hashes and timestamping are valid. Additional metadata about the certification may be displayed for legal purposes. Timestamping details are well known to ones skilled in the art. Information at https://en.wikipedia.orgiwiki/Trusted_timestamping provides timestamping details and is incorporated herein by reference.

Sub-suite Security 336 also handles security and data encryption 342. When encryption 342 is enabled, data is stored in encrypted form. The user may choose from 3 levels of security:

1) The highest level of security requires encryption password entry in order to access any data. This password is used for symmetric key generation which is used to store all data and to authenticate paired recorder 12. If the password is changed, data is not re-encrypted. Instead, a history of encryptions keys is encrypted with the current key, thereby allowing access to historical encrypted data.
2) A lower level of security allows for key storage using OS storage tied to the user account, thereby making the system vulnerable to the same attacks as OS level authentication.
3) The lowest level of security stores all data without encryption. Other security related measures include:
1) key-lengthening and other mechanisms may be used to prevent brute force attacks;
2) When a recorder 12 is Bluetooth paired to mobile application 14, it will self-erase, thereby preventing a lost device to divulge recorded data. Bluetooth LE pairing security is used to manage the secure connection between recorder 12 and phone 16. Information may be found at https://developer.bluetooth.org/TechnologyOverview/pages/le-security.aspx, incorporated herein by reference, and additional measures are contemplated to provide security beyond the Bluetooth standard; and
3) When a recorder 12 is USB paired to computer 20, it will self-erase. Pairing has to complete before data will be transferred to the computer, thereby preventing data extraction from a lost recorder. Furthermore, if USB authentication fails more than 10 times, the recorder resets to factory default state.

Other whitening and encryption techniques may be used to further protect user data, such as storing encryption keys centrally, thereby allowing multiple computers to authenticate the same recorder and visualize the encrypted data. Also, Wi-Fi communications 344 between mobile application 14 and PAR application 18 may be controlled by requiring communications to pass through recorder 12 when recorder 12's USB connection 132 is connected to computer 20's USB connection 346 and recorder 12's Bluetooth connection 130 is connected to mobile application 14 through phone 16's Bluetooth connection 348 (See FIG. 10).

Multiuser management 350 manages per-user recorder synchronization and pairing. It supports pairing multiple recorders, each of which represents a user to be authenticated, synchronized, and visualized. It is contemplated that some system users may only visualize their own data while other administrative users might visualize data from a group of users. This capability could be used by a family with children or a business which performs sales force tracking and analysis on their sales personnel. Query & dynamic event generation 352 handles filter & search 354 as shown in FIG. 13.

Figure 13:
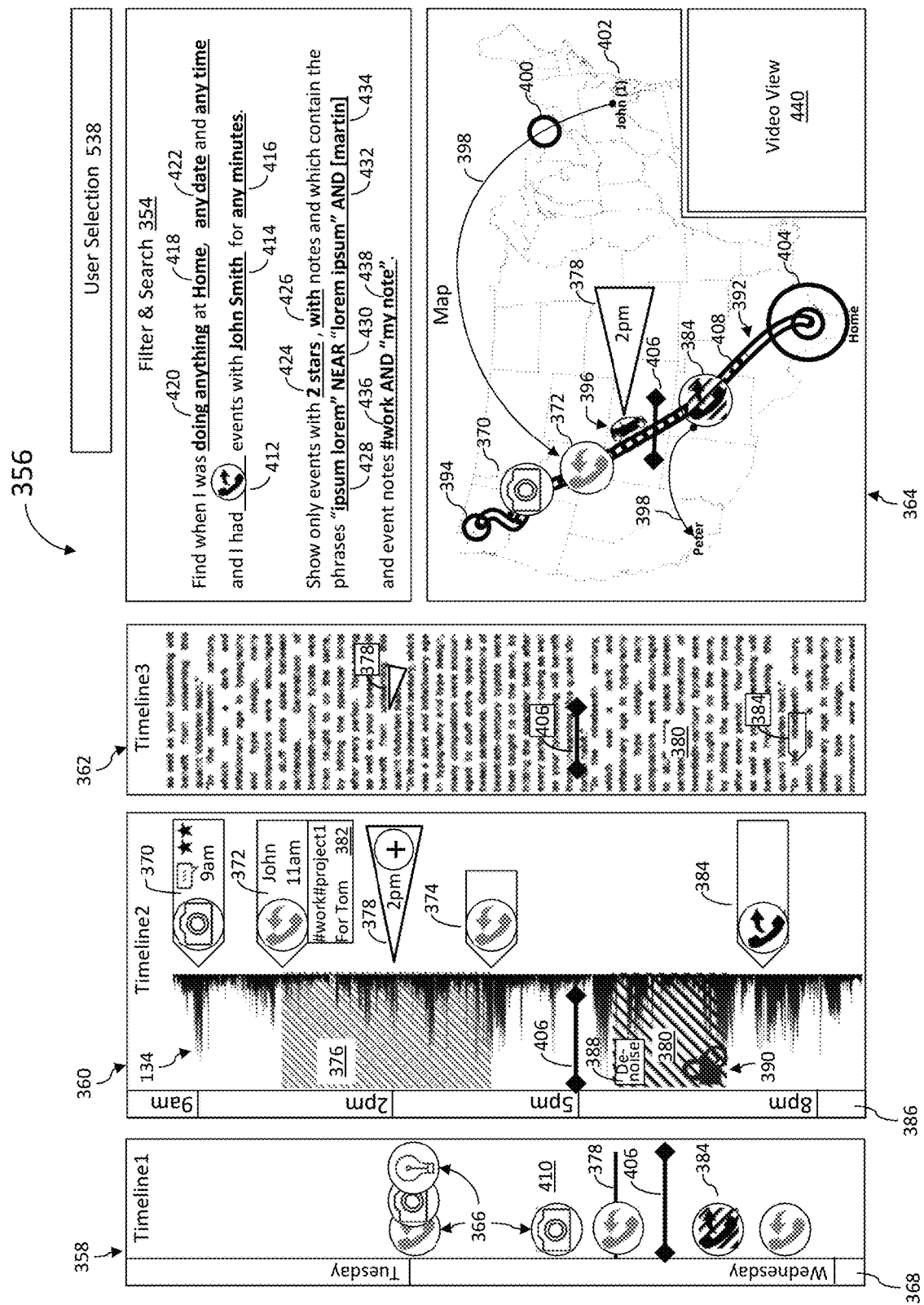
FIG. 13 shows a preferred embodiment of a user interface used by the PAR application shown in FIG. 11.

FIG. 13 shows a preferred embodiment of a user interface 356 that PAR application 18 may use with the system of FIG. 1, which is designed for larger screen devices such as tablet, laptop and desktop computers. It may run on any system node including mobile phone 16 and computer 20, and audio recorder 12 if it is sufficiently capable. All data is time normalized and displayed in time-windowed synchronized time domain views 358, 360, 362, spatial view 364, and video view 440, with the ability to organize and find audio both visually and via Filter & Search 354 in a continuous audio stream that may span years. As will be described, the combination of extensive event types, automated generation of various event types, continuous audio, query filtering, dynamic events, multi-dimensional simultaneous visualization, synchronization, and long term data collection allows for unprecedented levels of data mining in the space of audio.

Timeline1 358 shows a low-detailed view capable of visualizing a large number of events. Event bubbles 366 are automatically stacked depending on zoom level and number of bubbles. It can be continuously zoomed to intervals as little as 30 minutes to as much as several years, in which case it provides an excellent high level view into results provided by filter & search 354 or all events if no filter is specified. Ruler 368 shows time domain labels in a linear fashion, and depending on zoom level may delimit minutes, hours, days, weeks, months, or years.

Timeline2 360 provides a detailed time domain windowed view including Audio Summary 134, and details for events 370, 372. The user may continuously zoom and scroll to any segment of time. Because this view displays larger more detailed event bubbles, it is designed to show between 30 seconds and 3 days of data. Events which span time have both start points 372 and end points 374 shown, as well as the time range highlight 376. Events can be dragged to adjust their position in time. New events can be created at playback cursor 378 or range selection 380, shown as a diagonally-striped rectangle. Notes 382 can be added to events and can consist of free text as well as one or more hierarchical hash tags which can be used as part of filter & search 354 in order to simply filter events or create dynamic events 384 as a result of a compound query. Social sharing can be initiated either by range highlight 380 or event 372. Special "sharing bubbles" with start and end are added when sharing is initiated. Photo events 370 are automatically stacked above event start 372 and below event end 374, and can be added to the shared time range. Ruler 386 shows time domain labels, and depending on zoom level may delimit seconds, minutes, hours, or days. Range selection may also be used to select a range of audio that represents unwanted noise, and then tapping de-noise button 388. This calculates the noise profile for the selected audio and thereafter removes that noise during playback. This is useful when e.g. removing the background noise of a driving car in order to hear voices better.

Range selection may also be used to press proof of provenance button 390. This triggers the mathematical calculations to confirm authenticity of one or more data types in the selected range and displays a locked sign if successful. Further user interface elements are contemplated to allow (1) configuring which data types to authenticate (2) export the given data along with a calculated hash to prevent modification of the data (3) configure the application to hide all data outside of the authenticated range and optionally specific data types, thereby allowing a $3^{rd}$ party control of the computer without providing unauthorized access to personal data.

Timeline3 362 shows the results of automated or manual speech to text conversion and always shows the same time range as Timeline2 360. Text may also be manually edited and entered by the user. Text to speech results contain metadata including time spans for the spoken words, thereby allowing for complete inter-view synchronization and text is automatically laid out for close match to Timeline2 audio. When zoomed out and excessive text prevents alignment of Timeline3 text with Timeline2 audio, text is automatically decimated and font size is scaled down so the user can see where text exists without being able to read it until after zooming in, providing a high level visualization of when conversations took place.

Map 364 provides a spatial view. The spatial path 392 traveled by the user is shown for the given time range displayed in Timeline1 358, with circles 394 sized based on how long the user spent in that location. If several events have overlapped locations they can be grouped and display a count, thereby reducing user interface complexity. Physical activity 396 may be depicted graphically at the cursor and crosshair positions, with visualizations consisting of driving, walking, running, stationary, etc.

Phone Call Events 372, 384 show arcs 398 so the user can visually see where the other caller is located. The system builds a pre-compiled database of (1) world country and area code to address mappings and (2) spatial location calculated though geolocation AP is by converting each address to spatial location, thereby providing arc locations though phone number to geolocation lookup. The user may also manually specify a GPS location for a given contact phone number in order to obtain more accurate results. Overlapping arcs are grouped just like overlapping events. Tapping on events or the arcs automatically plays the given audio, during which time highlight 376, arcs 398, events 372, 374 may animate in color and opacity, thereby making it apparent that playback is for the given phone call. Tapping on grouped events or arcs multiple times cycles through playback of each event. Additionally, a ball 400 may animate along the arc in the direction of the phone call. If multiple phone events create overlapping arcs, multiple user names 402 may be displayed at the end of the arc, and each name may parenthetically specify the total number of events represented by the arc. Named Spatial Zones 404 can be defined and used with Filter & Search 354.

Video view 440 displays video captured by the system from either (1) video clips made by e.g. phones (2) video recorded continuously in addition to audio using a recorder which is equipped with a video sensor in addition to an audio sensor. Video view 440 displays the frame for current position of cursor 378. During audio playback, video view 440 plays the video synchronized with cursor 378.

To support visual data mining, time domain views 358, 360, 362, spatial view 364, and video view 440 are real-time synchronized in several ways. Crosshair 406 points to the same instant in time in all views. In map 364, time stamps are used to calculate interpolated GPS position for crosshair 406, Cursor 378 and events 370, 372, 384. Cursor 378 represents the current playback cursor in all views. When tapping or hovering over an event in one view, the same event is highlighted in all views. Data shown in Map 364 is time filtered by zooming or scrolling timeline1 358 to the desired time range, thereby interactively filtering all events and spatial paths 392 shown on the map. The sub-range of time displayed in timeline2 360 is shown in Map 364 via corresponding route highlight 408 and in timeline1 358 via corresponding highlight 410. Range selection 380 is synchronized between timeline2 and Timeline3 362. Tapping an event in Map 364 or timeline1 358 automatically moves Cursor 378 to that event, starts playback, and zooms timeline2 and timeline3 such that the event range 376 consumes 70% of the view. User interface 356 may also be synchronized between different system nodes, such that if an event is created in one node it will automatically appear in other nodes. E.g. creating an event on the audio recorder will automatically cause that event to appear on the phone.

Events can be filtered and dynamic events created via filter & search 354, the results of which are shown in all views. The query is specific to the given domain and structured as natural language in which underlined items can be modified to form the desired query which is then translated into queries against database 26 of FIG. 1. If no query parameters are entered, all views show all data for their given time ranges. The user may show only events of a given type by adding one or more event types to 412. Events such as phone call events may be further filtered by adding a contact name to 414, specifying a minimum or maximum length with 416, specifying a named map location 404 in 418, specifying an activity 420, specifying date or time ranges 422, selecting a star event requirement 424, and note requirement 426. With certain search criteria, dynamic events are created. E.g. in addition to the above filtering, the user can enter a text phrase 428 with optional operators 430, 432, phonetic speech 38 filter 434, event note hierarchical hashtags 436, and additional note text filters 438, thereby creating dynamic events 384 which represent the exact instant and interval which satisfies the compound query. Filter & Search 354 shows an example of a complex filter entry whose resultant dynamic events will satisfy all conditions and whose interval will include the phrases "ipsum lorem" and "lorem ipsum". Hierarchical hashtag "# work # project1" can be added to event notes 382 in order to classify a bookmark under "work" and sub-classified under "project!". This and other work related events can later be found by entering "# work" in Filter & search 354.

Dynamic events 384 are generated dynamically in response to user input to Filter & Search 354. E.g., Filter &

Search 354 is configured to find when specific phrases were said during a phone conversation event with a contact "John Smith". As a result, Dynamic Event 384 is added to all views. Tapping that event in any view starts audio playback at that instance in time. A dynamic event may also be converted to a permanent event for simplified later retrieval.

Note that additional functionality is not depicted for the sake of clarity. This includes functionality for managing background analysis work, managing users and groups, Bluetooth and USB pairing, theme settings, software update, Audio Recorder firmware update, general settings, EQ, playback speed and pitch control, noise removal level, etc. Also, multiple text to speech conversion engines may be added to the system and their output selected in timeline3. The time domain views may automatically switch cursor, ruler, and event time labels to present time in active the time zone at the current cursor position.

Figure 14:
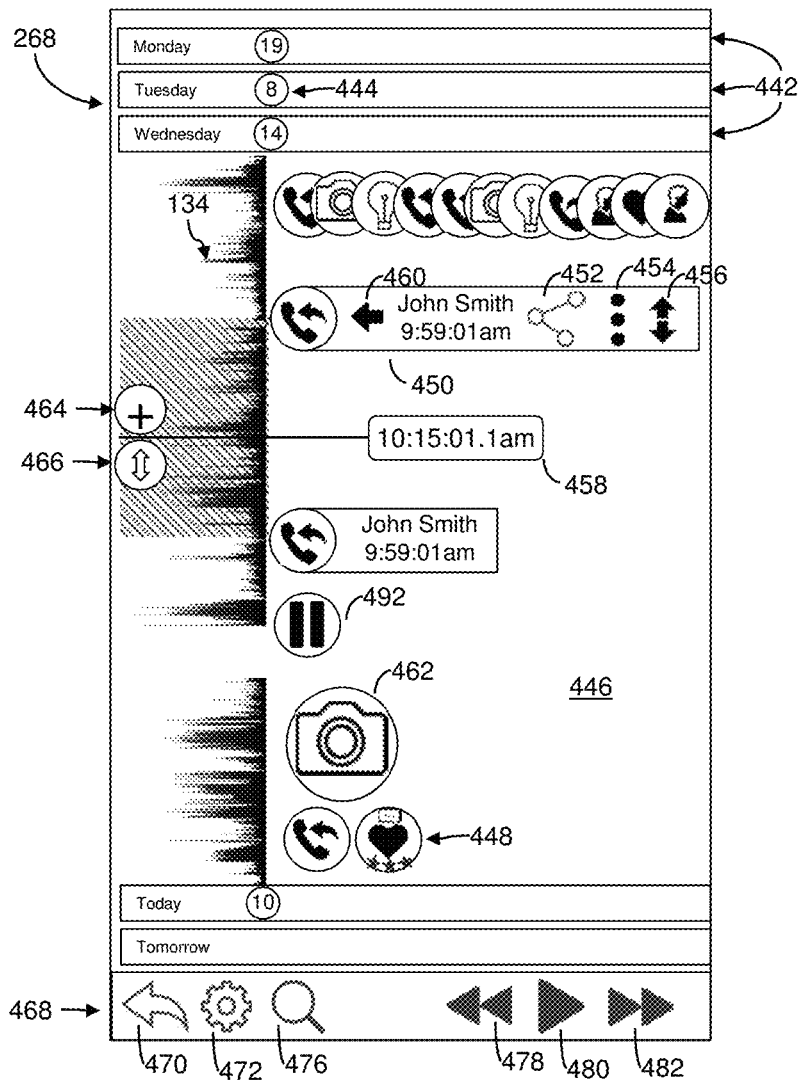
FIGS. 14, 15 and 16 show a preferred embodiment of a user interface that may be used by the mobile application of FIG. 10.

FIG. 14 shows mobile device optimized user interface 268 which may be used in the system of FIG. 1 and which contains some or all elements of user interface 356. Some elements are adapted for smaller mobile device screens. Days 442 may be grouped into collapsible elements with labels 444 showing the number of events for each day. Timeline1 358 and timeline2 360 of FIG. 13 are combined into a single timeline 446 which shows small event renderings 448 but allows for expansion of those events into larger event renderings 450 which then provide additional user interface controls, such as:

1) sharing audio or video 452;
2) opening an event properties panel 454 which allows adding events notes equivalent to event notes 382 in FIG. 13, as well as changing event type, adding/removing event interval, deleting an event, etc.
3) zooming 456 to the event such that the entire event interval will cover most of the screen. (E.g. when zooming to a 1-minute duration phone call event, the application will zoom into the timeline such that the phone call audio spans most of the screen.)
4) expanded events may be dragged in time domain, allowing the user to adjust event time. (E.g., a bookmark event start and end to cover the desired time interval.)
5) tapping the small event embedded in the expanded event cycles through the star rating of the event.

Small events 448 are automatically laid out such that they don't overlap vertically. If event density is high at a given zoom level, they are stacked horizontally. If the stack exceeds screen width, the stack is compressed such that the events overlap horizontally. This mechanism allows for the concurrent organized visualization of a large amount of bookmark, photo, meeting, phone call et al events.

Events have three visual states: (1) small unselected (2) small selected and (3) expanded. Tapping a small unselected event transitions it to state small selected, which animates the event, moves cursor 458, and starts audio playback at the event. Tapping a small selected event transitions that event to state expanded. Tapping button 460 or selecting another small event collapses an expanded event back to the selected state. Expanding and collapsing of events is animated, thereby giving the user visual feedback as to which small event was just generated from collapsing an event. Note that photo events show the actual photo image in the event and a small selected photo event 462 expands in size by about 2×, thereby making the image more discernable to the user.

Cursor 458 shows the current playback position. Cursor button 464 allows for the creation of new events at the cursor position. Cursor button 466 zooms to the current cursor position such that the view spans 60 seconds, allowing for efficient navigation to time domain detail. Tapping an expanded event zooms to that event, moves the cursor to the event, and starts playback. E.g. if the user taps on an expanded phone call event, the timeline automatically zooms such that the phone call spans most of the screen and starts audio playback of the phone call.

Toolbar 468 contains:

History Arrow symbol 470—allows the user to revert change made to cursor position and zoom and pan changes. This allows for efficient navigation when zooming into an event and then restoring the previous view. A long tap causes the entire history to be unwound.

Settings Gear symbol 472—opens Settings Panel 474.

Magnify Glass Search symbol 476—allows the user to filter events.

Previous Arrows symbols 478—allows for easy rewind of the audio playback position.

Play Arrow symbol 480—toggles audio playback.

Next Arrows symbol 482—allows for easy fast forward of the audio stream.

Figure 15:
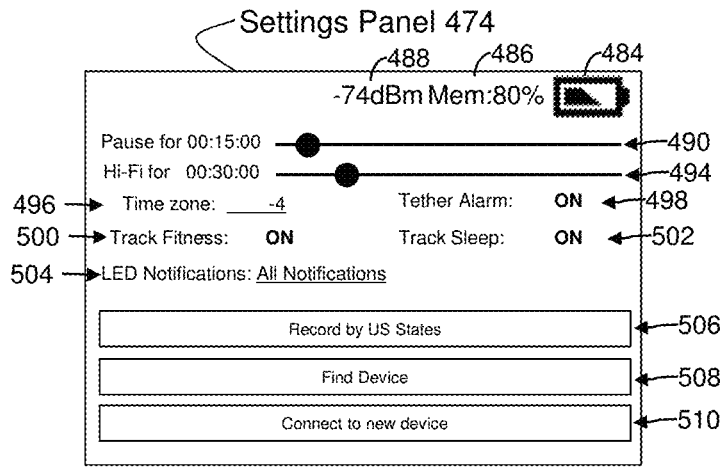

FIG. 15 shows Settings Panel 474 that allows for the configuration of phone 16 and recorder 12. Battery level indicator 484, memory used amount 486, and signal strength measurement 488 show the state of audio recorder 12 while in use. "Pause for" slider setting 490 allows the user to pause recording for up to 2 hours. When set, it automatically counts down until recording resumes. Pausing inserts event 492 (FIG. 14) whose start and interval represent the time during which system recording was paused. "Hi-Fi for" slider setting 494 allows the user to request high quality recording for a given length of time. Time zone setting 496 sets which time zone of those traveled by the user is used for visualization, thereby removing visual ambiguities. Tether alarm setting 498 allows the phone to sound an alarm when it loses connection to recorder 12. Track fitness setting 500 allows for the collection of fitness data such as steps which can be synchronized with $3^{rd}$ party fitness platforms. Sleep tracking setting 502 uses sensors to track sleep patterns and will generate sleep related events. Led notifications setting 504 allows the user to control the conditions under which recorder 12's LEDs light up. (E.g. a user can silence the LEDs in order to draw less attention.) Record by US States option 506 allows the user to pause recording automatically depending on current GPS US state location, thereby automatically complying with state laws. Find Device option 508 uses Bluetooth RSSI to determine approximate distance to recorder 12 and provides audio feedback of distance in order to facilitate finding the recorder. The reverse command can be given to recorder 12 which helps the user find the phone by divulging its location through sound. Connect to new device 510 allows recorder 12 to be paired to phone 16. Note that for security a newly paired recorder 12 will self-erase when forming a new pair. Various other settings are contemplated, including (1) setting recording quality by geographic location (such that e.g., the user can have high quality recording while at work) and (2) permanently setting minimum and maximum recording quality at the expense of battery life.

Figure 16:
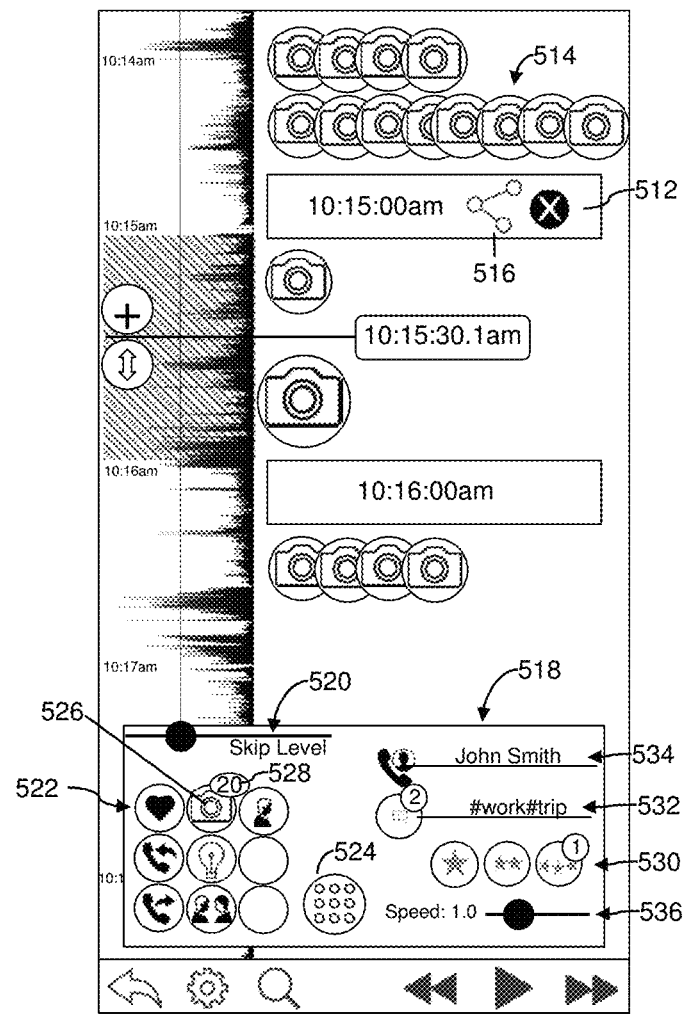

FIG. 16 shows mobile device user interface 268 being used to create a video slideshow. Equivalent functionality may be provided in desktop optimized user interface (P.A.R. application) 356 of FIG. 13. When sharing mode is enabled, special share events delimit the time range of audio to be shared. When sharing a video slideshow, all events except for photos are hidden, and all photo events 514 gravitate to the outside of the share range, thereby making all photos visible even when zoomed into an area without photos. Tapping on a photo moves it inside the share range, where photo events can be further dragged such that they are shown in the order to be used in the slideshow. Dragging a photo outside the share range causes it to once again gravitate against the share range. Tapping a photo causes it to enter selected state and display larger, making the image more discernable to the user. Finally, pushing share button 516 causes the slideshow to be computed using OpenGL renderings such as zoom, pan, or fade animations. A small logo is superimposed. Standard sharing mechanism are used to share to Facebook, email, file system, WhatsApp, Skype etc.

Filter panel 518 is the mobile-equivalent of filter & search 354 of FIG. 13. It is designed to be small and sit immediately above the toolbar such that filtering modification can be made while visualizing the data. Skip level slider 520 causes audio playback to automatically skip over segments below the given level. Event filter grid 522 allows the user to select any subset of event types, causing all unselected types to fade out of view and producing less cluttered event visualization. Long-tapping an event type causes all other types to be deselected. Tapping all events icon 524 causes all events to be selected and long-tapping causes none to be selected. Photo event filter 526 shows count balloon 528 which shows the number of events for the visualized day. This count is shown for unselected event types as well. The count balloon shown on top of collapsible days show the number of events after filtering is applied. This allows the user to find which day contains an event of interest. Star buttons 530 similarly allow showing only events with a given star rating. Note button 532 is used to hide events without notes and allows the user to filter events by their note content, including hash tags. Contact filter 534 allows the user to, for example, filter phone call events based on who the phone call was with, making it easy to find phone calls with specific people. Speed slider 536 is used to control audio playback speed between 0.7× and 3×.

The system that is shown and described in this specification is one preferred embodiment according to the invention. System 10 may be configured in several different ways while still achieving the goals of the invention. For example, system 10's algorithms, sensors, storage, and user interface components may be distributed to nodes different from what is shown and described. GPS collection may take place on wearable audio recorder 12 or a smart watch, and mobile device user interface 268 may or may not include spatial view 364 shown in FIG. 13. Audio capture may also be distributed differently. Phone conversations might be recorded directly on phone 16 in order to achieve highest quality. Algorithms may run on any node including cloud computing. If audio was recorded by multiple devices, the highest quality audio can be automatically chosen as the primary source. Additionally, audio recorders from different manufacturers, not specifically made for use with systems according to the invention, may also be used as the wearable recorder of the system, in place of recorder 12. Metadata from 3rd party audio files may be used to automatically import audio for the correct time range as well. The system may comprise only software applications which access data through nodes external to the system in the form of non-transitory computer-readable medium.

System 10 may be used in a variety of ways. Persons other than users 22 and 24 might only use the PAR software application 18 without recording their own data sets. When multiuser data streams are collected, User selection 538 FIG. 13 may be used to view and query the data of a specific user.

Finally, Database 26 may be stored in one or more locations including PC 20, phone 16, audio recorder 12, or cloud storage.

In addition to the aforementioned shown and described functionalities, systems according to the invention may also have other capabilities, such as collection of fitness data and showing fitness activity details in time domain views 358, 360, 362 and spatial view 364 of the user interfaces. Recorder 12 can be used as a Bluetooth gyro-mouse, or as a remote control for computer based media presentations, for example. The system may also be capable of wearable video or photo recording. Video can be either continuous or a clip of a given interval which can be represented as an event.

Another capability of systems according to the invention involves selection of a range of audio similar to social sharing, and automated outsourcing of selected audio to external human or algorithmic transcribers. Transcribers may be selected through a subscription, subcontracting, or reverse auction process. The selection process may include parameters such as language and vertical market specialization, transcriber ratings, cost, etc. Web based services in relation to human transcription outsourcing are contemplated and includes rating transcribers, bidding processes, etc. The resultant Speech to text 36 is automatically imported back into database 26 and may be bookmarked, data mined, exported, and shared like any other data. The user may select which speech to text engine results to visualize in timeline3 362 of FIG. 13. E.g. automated speech to text conversion may be performed using two different engines and a third plug-in engine can be the outsourced human transcription.

Another embodiment of the system according to the present invention does not include a separate audio recorder 12 and instead records audio and phone calls directly on phone 16, with the ability to visualize the data on phone 16 or computer 20. Additionally, recorder 12 may be used for continuous recording and direct phone 16 phone call recording may be used to augment the audio stream with high quality call recording. If audio was recorded by multiple devices, the highest quality audio can be chosen as the primary stream. E.g., if phone 16 recorded a phone call directly, the quality will generally be better than that of recorder 12.

Systems and software according to the invention have numerous advantages over other systems disclosed in the prior art. Systems according to the present invention provide the ability to data mine through synchronized time-domain, spatial-domain and filter views, thereby allowing the user to find audio in large data sets that can span years and which would otherwise be overwhelming and unusable. These capabilities have not been available previously. This system does not require users to make decisions to start recording, instead this system only requires the user to choose when to stop recording—a methodology that is the inverse of most existing systems, and which is necessary for the creation of a continuous long term data record. Additionally, systems according to the present invention allow for creation of time domain bookmarks in the time-continuous stream via user input to any system node and a variety of 3rd party databases such as phone call logs and calendars, thereby simplifying later retrieval.

Systems and software according to the invention do not have to create geotag links such as embedding GPS meta-data in photos. Such links between data types are inherent since all data is collected in the time domain, allowing it to collect all data sets independently from each other, thereby allowing data collection to run on a distributed set of nodes some of which may not have access to GPS location data and not requiring users to carry a single large device which incorporates all the recording processes. Data relationships are data→time and GPS→time and any data→GPS relationships are created purely for database caching and optimization purposes. Treating GPS data as a sub-sampled time domain data stream further allows the system to provide time-continuous interpolated GPS location for any instant in time, thereby not requiring a discrete GPS measurement for an event such as the user taking a photo. This allows for noise removal and simplification of the GPS data stream. For example, if the user was stationary without spatial noise limits and took 100 photos during that time, a single GPS data point may be used to represent 100's of stationary GPS measurements and span their time range, and all photos inside that time range can be considered to have been taken at the given location.

One advantage of systems and software made and used according to the teachings of the invention involves allowing for multiple playback units, including a small non-central unit which is carried with the user. It also has the advantage of supporting multiple recorders and users. Timestamp hash servers are used to authenticate data without requiring modification of the data.

Another advantage of systems and software made and used according to the teachings of the invention involves using a live map with markers that are generated dynamically from raw data. This maintains the original data streams, and time and spatial domain views display data interactively. That is, if the user scrolls the audio time "window", the system highlights that time window as a spatial path on the map, creating synchronized spatial and time views. If the user moves the audio time cursor, and interactively moves the map cursor to the time-equivalent location on the map.

While the invention has been illustrated and described in detail in the drawings and foregoing description, the same is to be considered as illustrative and not restrictive in character, it being understood that only preferred embodiments have been shown and/or described and that all changes and modifications that come within the spirit of the invention are desired to be protected.

I claim:

1. A system for audio data recording and retrieval, comprising:
   a wearable audio recording device having onboard,
      an audio collection sensor,
      an event collection sensor,
      a processor to record output from said collection sensors and pre-calculate sub-sampled audio data of recorded audio with a multi-leveled audio sub-sampling process,
      memory to store audio, events, and sub-sampled audio data, and
      a wireless gateway to transfer audio, events, and sub-sampled audio data; and
   a software application that, when loaded into a computing device in communication with said recording device,
      receives and processes audio, events, and sub-sampled audio data,
      uses memory accessible through the computing device to store processed audio, processed events, and processed sub-sampled audio data,
      uses a graphical user interface of the computing device to graphically display information representing a time interval of recorded audio sought through user search, wherein said information comprises
      an automatically generated visual graph which is based on the processed sub-sampled audio data for said time interval,
         simultaneous visual representation of processed events occurring during said time interval, positioned with said visual graph in a time-coinciding relationship, and
         dynamically updates said visual representations in real-time in response to user search of one of said visual representations, audio playback, or change in data or events.

2. The system of claim 1, wherein transfer of sub-sampled audio data is adjusted by said processor to a sample rate of said multi-leveled audio sub-sampling process dependent upon user search input.

3. The system of claim 1, wherein said event collection sensor comprises a user interface touch sensor allowing a user to create events.

4. The system of claim 1, wherein audio is stored without error correction in said memory of said recording device, and processing of said software application comprises error correction of audio.

* * * * *